Oct. 11, 1932.                H. MARLES                1,881,804
                          ROLLER BEARING CAGE
                          Filed March 23, 1931
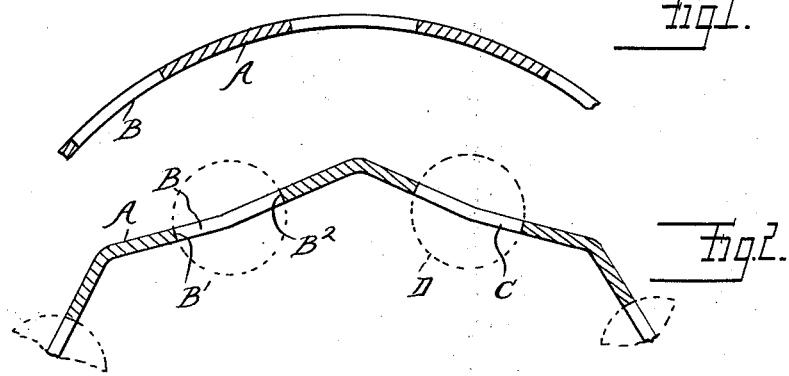
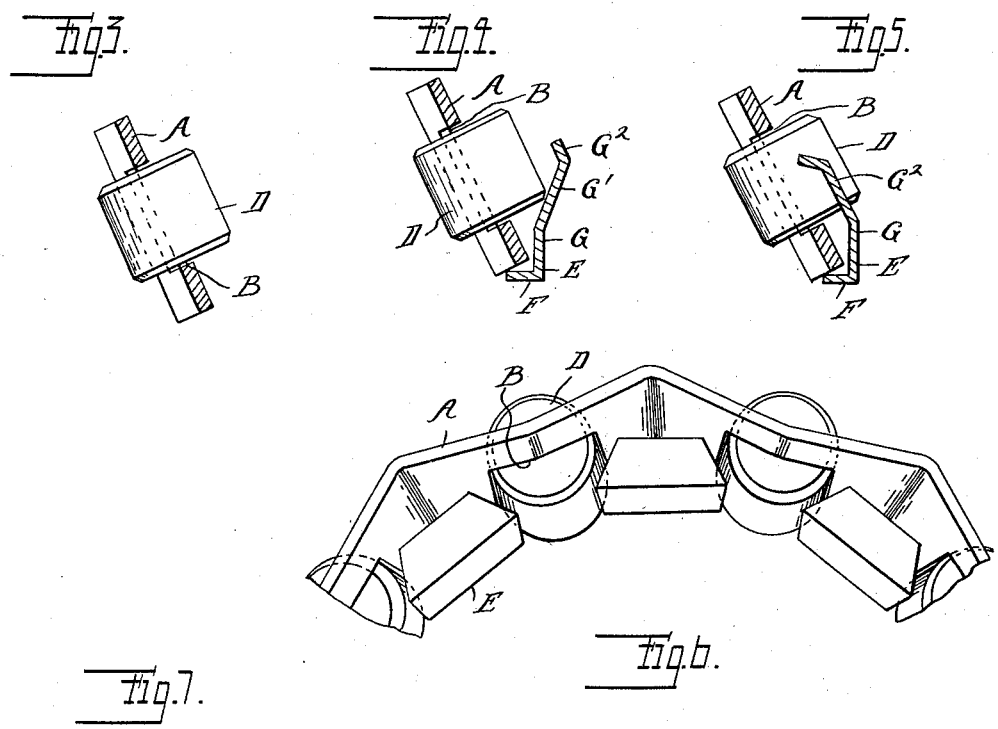
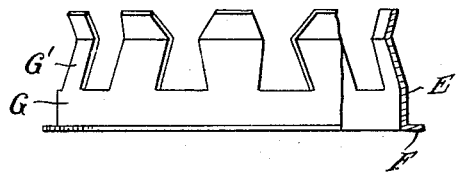
INVENTOR
Henry Marles
BY Whittemore Hulbut
Whittemore & Belknap
ATTORNEYS Patented Oct. 11, 1932

1,881,804

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

ROLLER BEARING CAGE

Application filed March 23, 1931. Serial No. 524,715.

The invention relates to roller bearing cages or retainers and is directed to the product which may result from the practice of the method disclosed in my prior field application, now Patent No. 1,794,634, granted March 3, 1931. The present invention consists in the novel construction hereinafter set forth.

In the drawing:

Figure 1 is a horizontal section through an element of a roller bearing cage showing the first step in the formation of the same;

Figure 2 is an enlarged view of a portion of the element shown in Figure 1 illustrating a second step in the process;

Figure 3 is a cross section showing a roll placed in engagement with the cage;

Figure 4 is a similar view with the retainer member in initial engagement with the cage;

Figure 5 is a similar view with the retainer bent into retaining position;

Figure 6 is a plan view of a portion of the completed cage and roll retainer;

Figure 7 is a sectional side elevation of one of the elements of the cage.

It is the primary object of the invention to obtain a construction of cage which has a considerable amount of rigidity and strength and at the same time is one which may be readily manufactured. With this object in view I have dispensed with the formation of bent flanges or tongues to act as roll retainers, and this enables me to form the cage of much heavier and more rigid stock. The retaining sockets are formed by first cutting apertures through the cage and then crimping the metal so as to arrange the original parallel side walls of the apertures in angular relation to each other, and in tangent relation to the rolls. Thus a simple annulus so apertured and crimped will form an effective cage for holding the rolls in spaced relation and limiting their radial outward movement. In order, however, to completely retain the rolls in engagement with the cage, they must be held from radial inward movement which is accomplished by an auxiliary annular tongued member as will be hereinafter set forth.

In detail, A is an annular cage member formed of relatively heavy sheet metal, and as specifically shown, of conical form. This member has formed therein, preferably by stamping, a series of apertures B which, as originally formed, have parallel side walls. The apertured portions of the annulus are then crimped as indicated at C which arranges the sides $B'$, $B^2$ thereof at an angle to each other and spaced apart by a distance less than the diameter of the roll. The rolls D may then be engaged with the recess from the inner side and the angling edges will be arranged in tangent relation and will prevent outward displacement.

To retain the rolls in the cage I form a second annular member E of lighter gauge metal having a portion for fitting within the lower end of the member A and provided with an outwardly extending flange F. The member E is further provided with upwardly extending tongues G which are so fashioned that when bent to the proper angle they will extend between adjacent rolls and will hold the same from inward displacement. The tongues G are initially formed with inwardly bent portions $G'$ and an outwardly bent portion $G^2$, both arranged to clear the rolls when the member is inserted in the lower end of the cage member A. The member E is then die pressed to bend the portions $G'$ outwardly into proximity with the rolls and the portions $G^2$ so as to extend between the rolls and into contact with the member A. The proportions are such that at the completion of this operation the portions $G'$ will be in close proximity to but out of direct rubbing contact with the cylindrical surfaces of the rolls when the latter are in engagement with the edges $B'$ and $B^2$ of the apertures in the member A. This will leave the rolls free for contact with the inner and outer face members of the bearing but will retain them in fixed relation to each other.

What I claim as my invention is:

1. A roller bearing cage comprising a conical member having spaced apertures therein for receiving the rolls, the edges of each aperture being spaced apart by less than the diameter of the roll, a second annulus insertable through the small end of said conical member, and having a shouldered engagement, and tongues on said second annulus adapted to be bent intermediate adjacent rolls into proximity thereto.

2. A roller bearing cage comprising a conical member having spaced apertures therein for receiving the rolls, the edges of each aperture being spaced apart by less than the diameter of the roll, a second annulus insertable through the small end of said conical member and having a shouldered engagement, and tongues on said second annulus adapted to be bent intermediate adjacent rolls into proximity thereto, said tongues having a portion extending between and clearing said rolls and bearing against said conical member.

3. A roller bearing cage comprising a conical member having a series of apertures therethrough for receiving spaced rolls, said conical member being crimped to bring the side edges of each aperture in angular relation to each other spaced by less than the diameter of the roller and tangent thereto, a roller in said apertures, and a second annular member inserted through the small end of said conical member and having a shouldered engagement therewith, said second annular member being provided with a series of tongues extending intermediate adjacent rolls, each tongue having a portion extending between adjacent rolls and with its side edges parallel to the axes of said rolls and a portion extending transversely between said rolls into contact with said first mentioned conical member.

4. A roller bearing cage comprising a conical portion having spaced apertures therein for receiving the rolls, the edges of each aperture being spaced apart by less than the diameter of the roll, a portion extending inward from the small end of said conical portion provided with tongues intermediate said apertures and on the inner side of the rolls, each of said tongues having a portion adapted to be bent with its opposite edges in proximity to the rolls and an angling portion extending outward and adapted to bear against said conical portion.

5. A roller bearing comprising a cage member having a conical portion provided with spaced apertures therein for receiving the rolls, the edges of each aperture being spaced apart by less than the diameter of the roll, tongue portions extending inward from the small end of said conical portion intermediate said apertures and with spaces therebetween less than the diameter of said rolls, said tongues being inwardly spaced from said conical portion to provide space for said rolls when in engagement with said apertures and being provided with outwardly extending angling portions for abutting against said conical portion.

In testimony whereof I affix my signature.

HENRY MARLES.